(12) United States Patent
Wu

(10) Patent No.: US 9,892,368 B2
(45) Date of Patent: Feb. 13, 2018

(54) METHOD AND APPARATUS FOR ACQUIRING TRAINING PARAMETERS TO CALIBRATE A MODEL

(71) Applicant: Tencent Technology (Shenzhen) Company Limited, Shenzhen (CN)

(72) Inventor: Xiaoping Wu, Shenzhen (CN)

(73) Assignee: TENCENT TECHNOLOGY (SHENZHEN) COMPANY LIMITED, Shenzhen, Guangdong (CN)

(*) Notice: Subject to any disclaimer, the term of this patent is extended or adjusted under 35 U.S.C. 154(b) by 0 days.

(21) Appl. No.: 15/187,571

(22) Filed: Jun. 20, 2016

(65) Prior Publication Data

US 2016/0307115 A1  Oct. 20, 2016

Related U.S. Application Data

(63) Continuation of application No. PCT/CN2014/089926, filed on Oct. 30, 2014.

(30) Foreign Application Priority Data

Mar. 25, 2014 (CN) .......................... 2014 1 0114054

(51) Int. Cl.
*G06F 17/00* (2006.01)
*G06N 99/00* (2010.01)
(Continued)

(52) U.S. Cl.
CPC ........... *G06N 99/005* (2013.01); *G06F 17/11* (2013.01); *G10L 15/063* (2013.01); *G10L 2015/0636* (2013.01)

(58) Field of Classification Search
CPC ....................................................... G06F 19/24
(Continued)

(56) References Cited

U.S. PATENT DOCUMENTS

| 6,044,344 A | 3/2000 | Kanevsky |
| 6,931,602 B1 | 8/2005 | Silver et al. |
| 2012/0066163 A1 | 3/2012 | Balls et al. |

FOREIGN PATENT DOCUMENTS

| CN | 102694800 A | 9/2012 |
| CN | 102779193 A | 11/2012 |

OTHER PUBLICATIONS

Tencent Technology, ISRWO, PCT/CN2014/089926, Feb. 4, 2015, 6 pgs.

(Continued)

*Primary Examiner* — David Vincent
(74) *Attorney, Agent, or Firm* — Morgan, Lewis & Bockius LLP

(57) ABSTRACT

Method and device of selecting training parameters for training a model are disclosed. The method includes: (1) setting a precision requirement for the model, and a first parameter value interval defined by an upper limit and a lower limit; (2) obtaining a first value point and a second value point within the first parameter value interval; (3) obtaining and comparing respective first and second error rates by respectively setting the training parameter at the first and second value points for the model; (4) updating three values out of the upper limit, the lower limit, the first value point and the second value point; (5) repeating steps (3) and (4), until the precision requirement is net by the respective first and second value points; and (6) obtaining the optimal value of the training parameter.

20 Claims, 4 Drawing Sheets

(51) Int. Cl.
*G10L 15/06* (2013.01)
*G06F 17/11* (2006.01)

(58) Field of Classification Search
USPC .................................................. 706/12, 45
See application file for complete search history.

(56) References Cited

OTHER PUBLICATIONS

Tencent Technology, IPRP, PCT/CN2014/089926, Sep. 27, 2016, 4 pgs.

Dan et al.; Prediction model of gas volume fraction based on golden section and BP network, Key Laboratory of Instrumentation Science & Dynamic of Measurement, Ministry of Education of North University of China, May 9, 2011, 3 pgs.

METHOD AND APPARATUS FOR ACQUIRING TRAINING PARAMETERS TO CALIBRATE A MODEL

PRIORITY CLAIM AND RELATED APPLICATION

This application is a continuation application of PCT Patent Application No. PCT/CN2014/089926, entitled "METHOD AND APPARATUS FOR ACQUIRING TRAINING PARAMETERS FOR A MODEL" filed on Oct. 30, 2014, which claims priority to Chinese Patent Application No. 201410114054.0, entitled "METHOD AND APPARATUS OF TRAINING PARAMETER ACQUISITION" filed on Mar. 25, 2014, both of which are incorporated by reference in their entirety.

FIELD OF THE TECHNOLOGY

The present disclosure relates to the field of computer technologies, and in particular, to a method of selecting training parameters for training a model and apparatus.

BACKGROUND

Sequence information includes information elements arranged in a row. For example, a paragraph of text may form a piece of sequence information, and elements of the sequence information are words in the paragraph of text. Currently, sequence information appears in many fields. For example, a user speaks a sentence to a mobile phone and intends the mobile phone to search the spoken sentence. The spoken sentence is sequence information that needs to be converted to text. For another example, a translation program that converts Chinese into English needs to cluster characters together to form words. A designer needs a model to analyze voices and Chinese texts.

To analyze the sequence information, identifying the information elements and the position of each information element, a terminal may perform prediction and analysis on the sequence information by using a model, so as to obtain, the information elements included by the sequence information and the position of each information element. Before the model is used, the model needs to be trained by voices and texts, so that the model can adjust its parameters to increase the accuracy of analysis.

Before performing prediction and analysis on the sequence information by using the training model, the terminal needs to acquire a value of a training parameter and calibrate the training model according to the training parameter to improve accuracy of the model. Therefore, before the training model the training model is calibrated, a technician estimates a training parameter according to experience and inputs the estimated training parameter in the terminal. The terminal receives the training parameter input by the technician and calibrates the training model by using the training parameter.

Having a technician making an estimate highly relies on the experience of the technician and there is no guarantee that the estimate is close to optimal. Therefore, it is desirable to have a method to automatically generate an optimal value of the training parameter.

SUMMARY

In accordance with some implementations of the disclosed technology, a method of selecting training parameters for training a model is disclosed. The method comprises: (1) setting a precision requirement for the model, and a first parameter value interval defined by an upper limit and a lower limit, the first parameter value interval being set wide enough to include an optimal value of a training parameter; (2) obtaining a first value point and a second value point within the first parameter value interval in accordance with a first predetermined formula, wherein the first value point is smaller than the second value point; (3) obtaining and comparing respective first and second error rates of the model by respectively setting the training parameter at the first and second value points for the model; (4) in accordance with a respective comparison result of comparing the respective first and second error rates, updating three values out of the upper limit, the lower limit, the first value point and the second value point, resulting in decreasing the first parameter value interval and a distance between the first value point and the second value point, wherein a relative order of the lower limit, the first value point, the second value point and the upper limit remains unchanged by the updating; (5) repeating steps (3) and (4), until the precision requirement is met by the respective first and second value points; and (6) when the precision requirement is met by the respective first and second error rates, obtaining the optimal value of the training parameter from between the first value point and the second value point in accordance with a second predetermined formula.

In another aspect, a device comprises one or more processors, memory, and one or more program modules stored in the memory and configured for execution by the one or more processors. The one or more program modules include instructions for performing the method described above. In another aspect, a non-transitory computer readable storage medium having stored thereon instructions, which, when executed by a device, cause the device to perform the method described above.

BRIEF DESCRIPTION OF THE DRAWINGS

The aforementioned features and advantages of the technology as well as additional features and advantages thereof will be more clearly understood hereinafter as a result of a detailed description of preferred embodiments when taken in conjunction with the drawings.

Like reference numerals refer to corresponding parts throughout the several views of the drawings.

DESCRIPTION OF EMBODIMENTS

Reference will now be made in detail to embodiments, examples of which are illustrated in the accompanying drawings. In the following detailed description, numerous specific details are set forth in order to provide a thorough understanding of the subject matter presented herein. But it will be apparent to one skilled in the art that the subject matter may be practiced without these specific details. In other instances, well-known methods, procedures, components, and circuits have not been described in detail so as not to unnecessarily obscure aspects of the embodiments.

To make the objectives, technical solutions, and advantages of the present disclosure more comprehensible, the embodiments of the present technology are described in further detail below with reference to the accompanying drawings.

Figure 1:
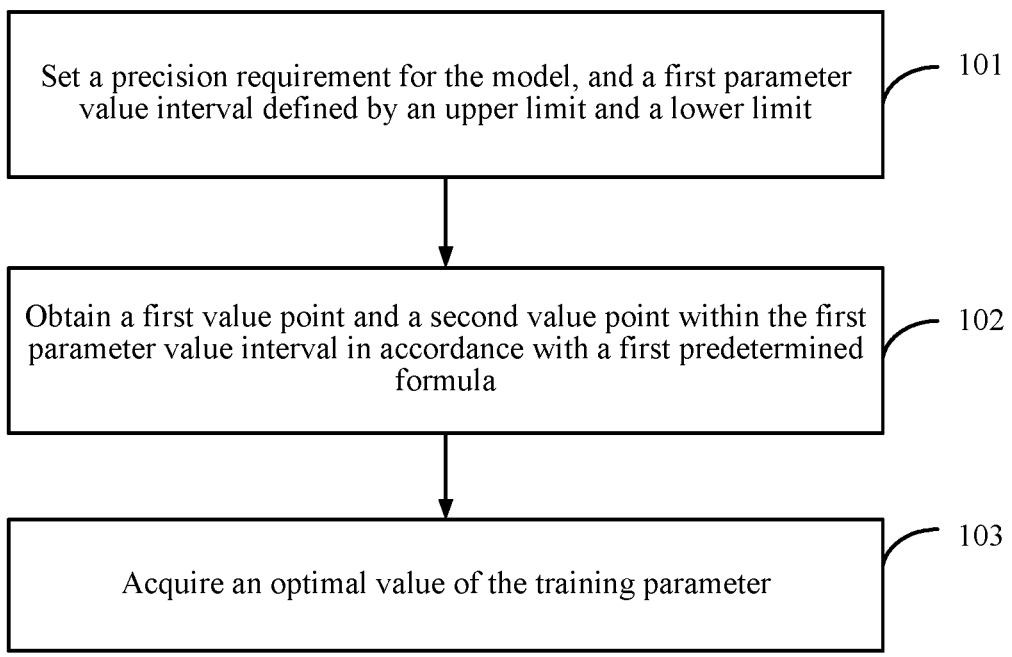
FIG. 1 is a flowchart of a method of selecting training parameters for training a model in accordance with some embodiments.

FIG. 1 is a flowchart of a method of selecting training parameters for training a model in accordance with some embodiments. The method can be performed by a computing device.

In accordance with some embodiments, in a step 101, the device setting a precision requirement for the model, and a first parameter value interval defined by an upper limit and a lower limit, the first parameter value interval being set wide enough to include an optimal value of a training parameter.

In accordance with some embodiments, in a step 102, the device obtains a first value paint and a second value point within the first parameter value interval in accordance with a first predetermined formula, wherein the first value point is smaller than the second value point;

In accordance with some embodiments, in a step 103, the device acquires a training parameter from the training parameter value interval.

Figure 2:
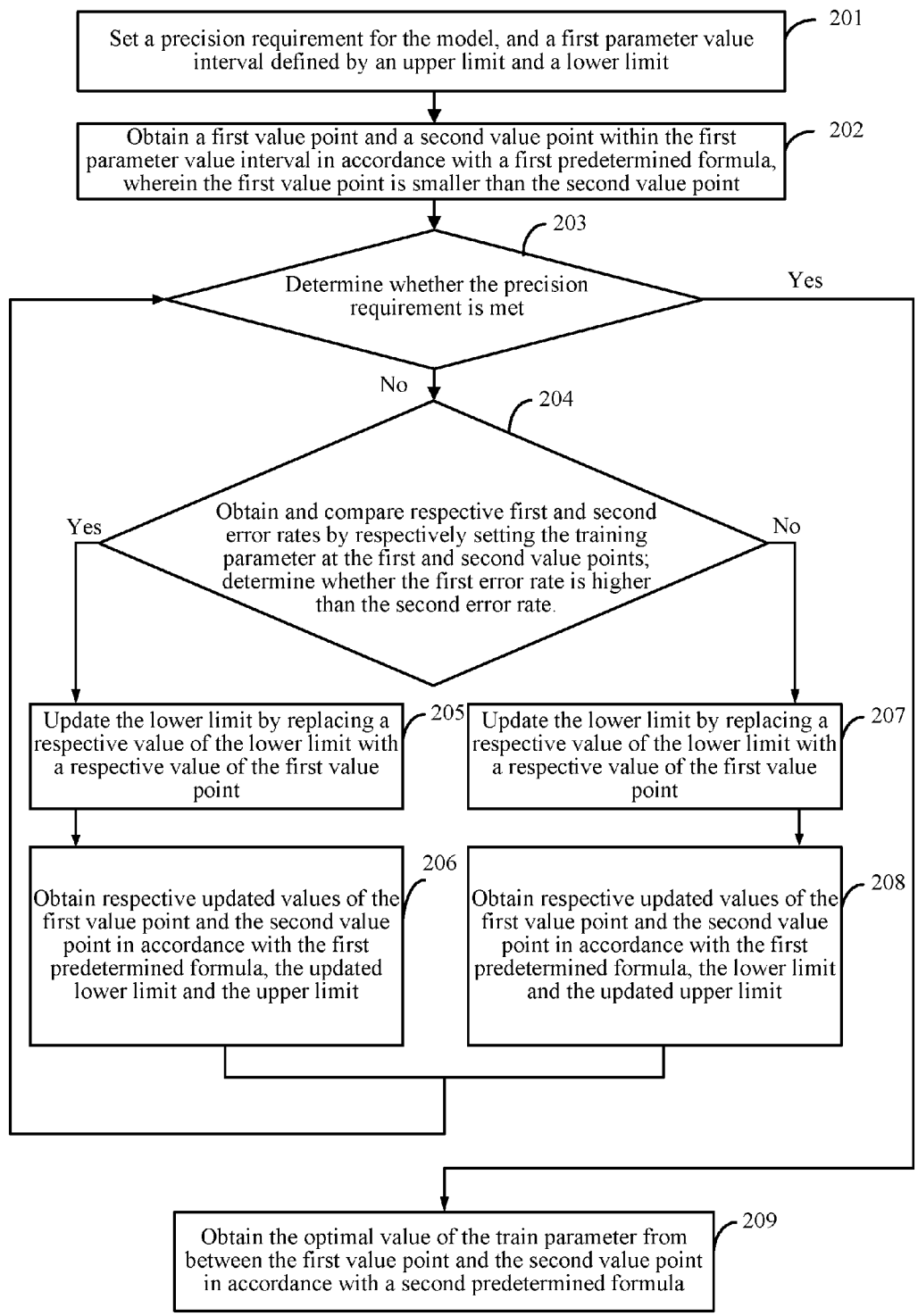
FIG. 2 is a flowchart of a method of selecting training parameters for training a model in accordance with some embodiments.

FIG. 2 is a flowchart of a method of training parameters in accordance with some embodiments. In some embodiments, the method is performed at a device of having one or more processors and memory for storing one or more programs to be executed by the one or more processors. In some embodiments, an optimization algorithm is used to automatically select, the training parameter with the minimum error rate.

In some embodiments, the model being trained is a Conditional Random Fields (CRF) model. The training parameter is set to prevent both over-fitting and under-fitting of the model.

In accordance with some embodiments, in a step 201, the device sets a precision requirement for the model, and a first parameter value interval defined by an upper limit and a lower limit, the first parameter value interval being set wide enough to include an optimal value of a training parameter.

For example, a user sets a first parameter value interval $[a_1, b_1]$, wherein $a_1$ is the lower limit and $b_1$ is the upper limit. Based on his previous experience of finding optimal values of training parameters, the user sets the first parameter value interval $[a_1, b_1]$ to be wide enough so that the optimal value of the training parameter δ is included in the first parameter value interval.

In accordance with some embodiments, in a step 202, the device obtains a first value point and a second value point within the first parameter value interval in accordance with a first predetermined formula, wherein the first value point is smaller than the second value point.

In accordance with some embodiments, the first predetermined formula includes that the first value point is higher than the lower limit by a predetermined fraction of the first parameter value interval and the second value point is lower than the upper limit by the predetermined fraction of the first parameter value interval.

In some embodiments, the predetermined fraction is 0.382, which is called the 0.618 method, the Fibonacci, and so on. For example, a first value point $c_1=a_1+0.382\times(b_1-a_1)$ is calculated according to the predetermined fraction 0.382 (which is 1−0.618) and a lower limit value $a_1$ and an upper limit value $b_1$. And a second value point $d_1=a_1+0.618\times(b_1-a_1)$, which is equivalent of $d_1=b_1-0.382\times(b_1-a_1)$. An interval is determined, a lower limit value of the interval is set as the first value point $c_1$, an upper limit value of the interval is set as the second value point $d_1$, and an interval $[c_1, d_1]$ is defined as the second parameter value interval. In some embodiments, the predetermined fraction can be other value as well, e.g., ⅓, 25%, etc.

In accordance with some embodiments, in a step 203, the device determines whether the precision requirement is met by the first and second value points. If the precision requirement is met, perform the step 209; if not, perform the step 204.

In accordance with some embodiments, the precision requirement includes that the respective distance between the respective first value point and the respective second value point is smaller than a predetermined precision value L.

For example, a precision requirement is that length of the second parameter value interval $[c_1, d_1]$ does not exceed the precision value L. A difference $(d_1-c_1)$ between the first and second value points is calculated and the length $(d_1-c_1)$ and the precision value L are compared. If the length $(d_1-c_1)$ is smaller than the precision value L, it is determined that the second parameter value interval $[c_1, d_1]$ meets the precision requirement.

In accordance with some embodiments, the precision requirement includes that a respective difference between the respective first and second error rates of the model corresponding to the first and second value points is smaller than a predetermined precision value. In some embodiments, the precision requirement is that the absolute value of the difference between the first error rate and the second error rate does not exceed the precision value. The first error rate and the second error rate are calculated, and the absolute value of the difference between the first error rate and the second error rate is calculated. If the absolute value and a preset precision value are compared; if the absolute value is smaller than the preset precision value, it is determined that the second parameter value interval meets the precision requirement.

For example, it is assumed that, for the second parameter value interval $[c_1, d_1]$, a first error rate is $f(c_1)$, and a second error rate is $f(d_1)$. A precision requirement is that an absolute value $|f(c_1)-f(d_1)|$ of a difference between the first error rate $f(c_1)$ and the second error rate $f(d_1)$ does not exceed the precision value L. The first error rate $f(c_1)$ and the second error rate $f(d_1)$ are calculated, and the absolute value $|f(c_1)-f(d_1)|$ is calculated subsequently. The absolute value $|f(c_1)-f(d_1)|$ and the preset precision value L are compared; if the absolute value $|f(c_1)-f(d_1)|$ is smaller than the preset precision value L, it is determined that the second parameter value interval $[c_1, d_1]$ meets the precision requirement.

In accordance with some embodiments, the precision requirement includes that a combination of previous two requirements, which is that the respective difference between the respective first and second error rates of the model being smaller than a first predetermined precision value and the respective difference between the respective first and second error rates of the model being smaller than a predetermined precision value.

In accordance with some embodiments, in a step 204, the device obtains and compares respective first and second error rates of the model by respectively setting the training parameter at the first and second value points for the model. If the second parameter value interval does not meet the precision requirement, the first error rate and the second error rate are compared; if first error rate is greater than the error rate corresponding to the upper limit value, the step 204 is performed; otherwise, the step 207 is performed.

In accordance with some embodiments, calculating the first error rate and the second error rate specifically includes: using the first value point as the training parameter, training a model by using the training information and the first value point, then analyzing the test information by using the trained training model, and taking statistics of an analysis result; comparing the statistical analysis result and the acquired correct analysis result, acquiring the number of the analysis results inconsistent with the correct analysis result, calculating a ratio of the number of the analysis results inconsistent with the correct analysis result to the total number of analysis results, and using the ratio as an error rate of the test information; for each part of sequence information, other than the part of sequence information used as the test information, in the N parts of the sequence information, acquiring an error rate of each of the other parts of the sequence information according to the foregoing operations; after error rates of the N parts of the sequence information are acquired according to the foregoing method, calculating an average value of the error rates of the N parts of the sequence information, and using the calculated average value as the first error rate; and calculating the second error rate in the same way according to the foregoing method.

In accordance with some embodiments, in a similar process, calculating error rates includes the following steps. (a) The device divides a labeled corpus into multiple portions, e.g., dividing into N equal parts. (b) The device sets a first portion of the multiple portions as respective testing samples, wherein the first portion has not been used as testing samples to generate an error rate for the model before, and wherein a remainder of the multiple portions is used as respective training samples for the model. (c) The device obtains a respective error rate of the model corresponding to the respective testing samples and the first value point, further comprising: setting the training parameter of the model at the first value point; training the model with the respective training samples to obtain respective first values of a predetermined set of model parameters; and obtaining the respective error rate for the respective testing samples by testing the model against the testing samples using the obtained respective first values of the predetermined set of model parameters. (d) Through a similar process of step (c). The device obtains the respective error rate of the model corresponding to the respective testing samples and the second value point, further comprising: setting the training parameter of the model at the second value point; training the model with the respective training samples to obtain respective second values of the predetermined set of model parameters; and obtaining the respective error rate for the respective testing samples by testing the model against the testing samples using the obtained respective second values of the predetermined set of model parameters. (e) The device repeats steps (b)-(d) until each of the multiple portions has been used as testing samples once. (f) The device obtains the first error rate by averaging the error rates corresponding to each of the multiple portions as testing samples and the first value point as a respective value for the training parameter. (g) The device obtains the second error rate by averaging the error rates corresponding to each of the multiple portions as testing samples and the second value point as the respective value for the training parameter. And (h) the device determining which of the respective first error rate or the respective second error rate is higher.

For example, the device divides a labeled corpus into seven parts (Part 1 through Part 7) and sets the training parameter of a model at a value point. The device then uses Part 1 as the testing sample and Parts 2-7 as training samples. The device uses the training samples to train the model to obtain values of a predetermined set of model parameters. Using the set of model parameters, the model analyzes the testing sample which produces a first error rate. Then the device uses Part 2 as the testing sample and Parts 1 and 3-8 as training samples to obtain a second error rate. The device repeats the process, until all seven error rates have been produced by Parts 1 to 7 being used as testing samples in turn. The error rate corresponding to the value point of the training parameter is the average of the seven error rates.

In accordance with some embodiments, in accordance with a respective comparison result of comparing the respective first and second error rates, in steps 205-208, the device updates three values out of the upper limit, the lower limit, the first value point and the second value point, resulting in decreasing the first parameter value interval and a distance between the first value point and the second value point. Notes that when the device updates three values out of the upper limit, the lower limit, the first value point and the second value point, the relative order of the lower limit, the first value point, the second value point and the upper limit remains unchanged by the updating.

For example, the first error rate $f(c_1)$ and the second error rate $f(d_1)$ are compared. If the first error rate $f(c_1)$ is greater than the second error rate $f(d_1)$, increasing the lower limit, the first value point and the second value point, while keeping the upper limit unchanged; if the first error rate is lower than the second error rate, decreasing the upper limit, the first value point and the second value point, while keeping the lower limit unchanged.

In accordance with some embodiments, in a step 205, the device updates the lower limit by replacing a respective value of the lower limit with a respective value of the first value point.

For example, on the basis that the first error rate $f(c_1)$ is greater than the second error rate $f(d_1)$, an interval $[a_1, c_1]$ is deleted from the first parameter value interval $[a_1, b_1]$, and after deletion, the lower limit value is changed to the first value point. As a result, the first parameter value interval changes to $[c_1, b_1]$.

After the first parameter value interval is updated, it is required to update the second parameter value interval according to the step 206 in the following.

In accordance with some embodiments, in a step 206, the device obtains respective updated values of the first value point and the second value point in accordance with the first predetermined formula, the updated lower limit and the upper limit, updates the first and second value points with the respective updated values, and then returns to perform the step 203.

For example, as discussed above, in some embodiments, the first predetermined formula is the 0.618 method. Accordingly, $c_1=a_1+0.382\times(b_1-a_1)$. When the lower limit moves to the first value point while the upper limit keeps unchanged, i.e., $a_2=c_1$ and $b_2=b_1$, then $c_2=a_2+0.382\times(b_2-a_2)=c_1+0.382\times(b_1-c_1)$. In addition, based on the 0.618 method, $d_1=a_1+0.618\times(b_1-a_1)$. Therefore, similarly, $d_2=c_1+0.618\times(b_1-c_1)$.

In accordance with some embodiments, in a step 207, the device updates the upper limit by replacing a respective value of the upper limit with a respective value of the second value point.

For example, on the basis that the first error rate $f(c_1)$ is smaller than the second error rate $f(d_1)$, an interval $[d_1, b_1]$ is deleted from the first parameter value interval $[a_1, b_1]$, and after deletion, the lower limit value is moved to the first value point. As a result, the first parameter value interval changes to $[a_1, d_1]$.

In accordance with some embodiments, in a step 208, the device obtains respective updated values of the first value point and the second value point in accordance with the first predetermined formula, the lower limit and the updated upper limit, updates the first and second value points with the respective updated values, and then returns to perform the step 203.

For example, using 0.618 method again, $c_1 = a_1 + 0.382 \times (b_1 - a_1)$ and $d_1 = a_1 + 0.618 \times (b_1 - a_1)$. When the upper limit moves to the second value point while the lower limit keeps unchanged, i.e., $a_2 = a_1$ and $b_2 = d_1$, then $c_2 = a_1 + 0.382 \times (d_1 - a_1)$ and $d_2 = a_1 + 0.618 + (d_1 - a_1)$.

In summary, each cycle of steps 205-206 or steps 207-208 shortens the lengths of the first and second intervals. When the first error is greater, the first and second intervals decreases from the left; when the second error rate is greater, the first and second intervals decreases from the right. One of the rationales of such design is that the further of a value point from the optimal value of the training parameter, the higher will be the corresponding error rate of the value point. Therefore, the first and second intervals should shrink from the end having the higher error rate. Another rationale is that when the first error rate is higher than the second error rate, the optimal value of the training parameter is definitely not between the lower limit and the first value point. Therefore, removing the interval between the lower limit and the first value point helps to narrow the scope of searching for the optimal value of the training parameter. The similar rationale applies to removing the interval between the second value point and the upper limit when the second error rate is higher.

In accordance with some embodiments, in a step 209, the device obtains the optimal value of the training parameter from between the first value point and the second value point in accordance with a second predetermined formula. The device determines the second value interval has reached the precision requirement and therefore determines the second value interval as the training parameter value interval.

In accordance with some embodiments, the second predetermined formula specifies that the optimal value of the training parameter is an average of the first value point and the second value point. Therefore, when the second parameter value interval is $[c_5, d_5]$, the training parameter is calculated by $\delta = (c_5 + d_5)/2$.

In accordance with some embodiments, the second predetermined formula specifies that the optimal value of the training parameter is an average of the first value point and the second value point weighted by respective reciprocals of the respective first and second error rates. Suppose the first and second error rates are $f(c_5)$ and $f(d_5)$, the training parameter is calculated by $\delta = (c_5/f(c_5) + d_5/f(d_5))/(1/f(c_5) + 1/f(d_5))$. In this case, the distance between the obtained value of $\delta$ and the first value point is in reverse proportion to the first error rate and the distance between the obtained value of $\delta$ and the second value point is in reverse proportion to the second error rate.

In some embodiments, if the obtained value of $\delta$ is too close to $a_1$ or $b_1$, e.g., the distance from $\delta$ to any of them is smaller than L or 2L, then it indicates that the original selection of $a_1$ or $b_1$ is not wide enough. In this case, the designer can moves $a_1$ or $b_1$ to left or right and repeat the steps above.

Below is a specific example of applying the method in accordance with some embodiments. To simplify the matter, it is assumed that a relationship between an error rate f and a training parameter $\delta$ is: $f(\delta) = (\delta - 1)^2$. Note that while an express relationship between the error rate and the training parameter $\delta$ is assumed, the designer training the model does not know it and still has to undertake all step to find the optimal value of $\delta$.

1) Select the first parameter value interval $[a_1, b_1]$ as $[0, 2]$, the precision value L as 0.03 and the precision requirement that the distance between the first and second value points is smaller than L.

2) Obtain the first value point $c_1$ and the second value point $d_1$ of the second parameter value interval $[c_1, d_1]$ and first and second error rates separately, using the 0.618 method. Given the assumed relationship $f(\delta) = (\delta - 1)^2$, the device obtains: $c_1 = a_1 + 0.382 \times (b_1 - a_1) = 0 + 0.382 \times (2 - 0) = 0.764$, $d_1 = a_1 + 0.618 \times (b_1 - a_1) = 0 + 0.618 \times (2 - 0) = 1.236$, $f(c_1) = (0.764 - 1)^2 = 0.055696$, and $f(d_1) = (1.236 - 1)^2 = 0.055696$.

3) Because $d_1 - c_1 = 0.472 > L$ and $f(c_1) \leq f(d_1)$, move the upper limit to the second value point: $a_2 = a_1 = 0$, $b_2 = d_1 = 1.236$, wherein after the update, the first parameter value interval $[a_2, b_2]$ is $[0, 1.236]$.

Update the second parameter value interval: $d_2 = c_1 = 0.764$, $c_2 = a_2 + 0.382 \times (b_2 - a_2) = 0 + 0.382 \times (1.236 - 0) = 0.472152$, wherein after the update, the second parameter value interval $[c_2, d_2]$ is $[0.472152, 0.764]$.

Obtain error rates corresponding to $c_2$ and $d_2$ respectively: $f(c_2) = (0.472152 - 1)^2 = 0.278624$, $f(d_2) = (0.764 - 1)^2 = 0.055696$.

4) Because $d_2 - c_2 = 0.291848 > L$ and $f(c_2) > f(d_2)$, move the lower limit to the first value point: $a_3 = c_2 = 0.472152$, $b_3 = b_2 = 1.236$, wherein after the update, the first parameter value interval $[a_3, b_3]$ is $[0.472152, 1.236]$, Update the second parameter value interval: $c_3 = d_2 = 0.764$, $d_3 = a_3 + 0.618 \times (b_3 - a_3) = 0.94421$, wherein after the update, the second parameter value interval $[c_3, d_3]$ is $[0.764, 0.94421]$; and calculate the first and second error rates respectively: $f(c_3) = 0.055696$, $f(d_3) = 0.0031125$.

5) Because $d_3 - c_3 = 0.18021 > L$, and $f(c_3) > f(d_3)$, move the lower limit to the first value point: $a_4 = c_3 = 0.764$, $b_4 = b_3 = 1.236$, wherein after the update, the first parameter value interval $[a_4, b_4]$ is $[0.764, 1.236]$.

Update the second parameter value interval: $c_4 = d_3 = 0.94421$, $d_4 = a_4 + 0.618 \times (b_4 - a_4) = 1.055696$, wherein after the update, the second parameter value interval $[c_4, d_4]$ is $[0.94421, 1.055696]$; and obtain error rates corresponding to the $c_4$ and the $d_4$ respectively: $f(c_4) = 0.0031125$, $f(d_4) = 0.0031020$.

6) Because $d_4 - c_4 = 0.111486 > L$ and $f(c_4) > f(d_4)$, move the lower limit to the first value point: $a_5 = c_4 = 0.94421$, $b_5 = b_4 = 1.236$. After the update, the first parameter value interval $[a_5, b_5]$ is $[0.94421, 1.236]$.

Update the second parameter value interval: $c_5 = d_4 = 1.055696$, $d_5 = a_5 + 0.618 \times (b_5 - a_5) = 1.12454$. After the update, the second parameter value interval $[c_5, d_5]$ is $[1.055696, 1.12454]$. Obtain the first and second error rates corresponding to $c_5$ and $d_5$ respectively: $f(c_5) = 0.0031020$, $f(d_5) = 0.015509$.

7) Because $d_5 - c_5 = 0.068844 > L$ and $f(c_5) > f(d_5)$, move the upper limit to the second value point: $a_6 = a_5 = 0.94421$, $b_6 = d_5 = 1.12454$, wherein after the update, the first parameter value interval $[a_6, b_6]$ is $[0.94421, 1.12454]$.

Update the second parameter value interval: $d_6=c_5=1.055696$, $c_6=a_6+0.382\times(b_6-a_6)=1.013096$, wherein after the update, the second parameter value interval $[c_6, d_6]$ is [1.013096, 1.055696]; and obtain error rates corresponding to the $c_6$ and the $d_6$ respectively: $f(c_6)=0.0001715$, $f(d_6)=0.0031020$.

8) Because $d_6-c_6=0.0426>L$, and $f(c_6)<f(d_6)$, move the upper limit to the second value point: $a_7=a_6=0.94421$, $b_7=d_6=1.055696$, wherein after the update, the first parameter value interval $[a_7, b_7]$ is [0.94421, 1.055696];

Update the second parameter value interval: $d_7=c_6=1.013096$, $c_7=a_7+0.382\times(b_7-a_7)=0.98680$, wherein after the update, the second parameter value interval $[c_7, d_7]$ is [0.98680, 1.013096]; and obtain error rates corresponding to the $c_7$ and the $d_7$ respectively: $f(c_7)=0.00017430$, $f(d_7)=0.00017150$.

9) Because $d_7-c_7=0.026<L$, which meets the precision requirement, calculate the training parameter $\delta=(c_7+d_7)/2=0.999948$. Since 0.999948 is not too close to either 0 (a1) or 2 (b1), the original selection of $a_1$ and $b_1$ is not shown to be too narrow. Generate the optimal value of $\delta$ as 0.999948 and end the operation.

Figure 3:
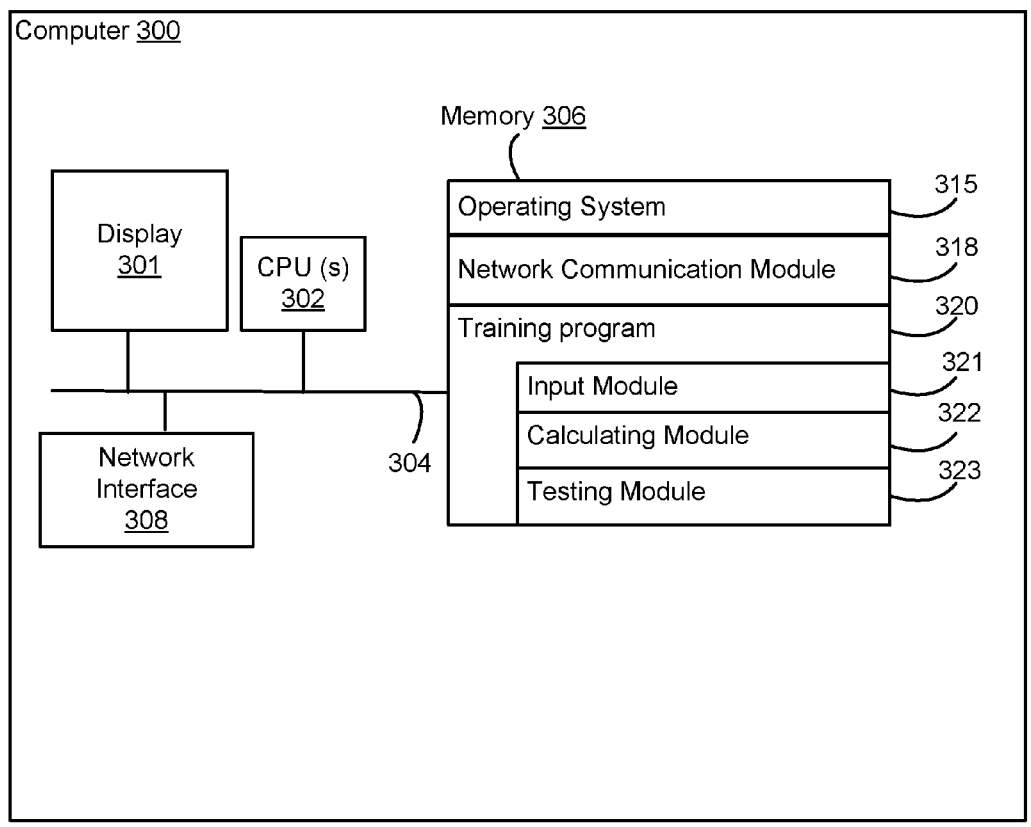
FIG. 3 is a diagram of an example implementation of a device in accordance with some embodiments.

FIG. 3 is a diagram of an example implementation of a device 300 in accordance with some embodiments. While certain specific features are illustrated, those skilled in the art will appreciate from the present disclosure that various other features have not been illustrated for the sake of brevity and so as not to obscure more pertinent aspects of the implementations disclosed herein. To that end, the device 300 includes one or more processing units (CPU's) 302, one or more network or other communications interfaces 308, a display 301, memory 306, and one or more communication buses 304 for interconnecting these and various other components. The communication buses may include circuitry (sometimes called a chipset) that interconnects and controls communications between system components. The memory 306 includes high-speed random access memory, such as DRAM, SRAM, RAM or other random access solid state memory devices; and may include non-volatile memory, such as one or more magnetic disk storage devices, optical disk storage devices, flash memory devices, or other non-volatile solid state storage devices. The memory 306 may optionally include one or more storage devices remotely located from the CPU(s) 302. The memory 306, including the non-volatile and volatile memory device(s) within the memory 306, comprises a non-transitory computer readable storage medium.

In some implementations, the memory 306 or the non-transitory computer readable storage medium of the memory 306 stores the following programs, modules and data structures, or a subset thereof including an operating system 316, a network communication module 318, and a training program 320.

In accordance with some embodiments, the operating system 316 includes procedures for handling various basic system services and for performing hardware dependent tasks.

In accordance with some embodiments, the network communication module 318 facilitates communication with other devices via the one or more communication network interfaces 308 (wired or wireless) and one or more communication networks, such as the internet, other wide area networks, local area networks, metropolitan area networks, and so on.

In accordance with some embodiments, the training program 320 is configured to select training parameters for training models. In some embodiments, the training program 320 comprises an input module 321, a calculating module 322, and a testing module 323. In some embodiments, the input module 321 is configured to obtain precision requirement, the upper and lower limits of the first parameter value interval, and sometimes a selection of the first and second predetermined formulas. The calculating module 322 is configured to obtain the first and second value points, compare error rates, judge whether precision requirement is met, and obtain the optimal value of the training parameter when the precision requirement is met. The testing module 323 is configured to acquire testing and training materials and obtain error rates for corresponding value points using the acquired testing and training materials.

In some embodiments, the training program 320 is configured to perform at least the following operations to select training parameters for training a model:

(1) Setting a precision requirement for the model, and a first parameter value interval defined by an upper limit and a lower limit, the first parameter value interval being set wide enough to include an optimal value of a training parameter;

(2) Obtaining a first value point and a second value point within the first parameter value interval in accordance with a first predetermined formula, wherein the first value point is smaller than the second value point;

(3) Obtaining and comparing respective first and second error rates of the model by respectively setting the training parameter at the first and second value points for the model;

(4) In accordance with a respective comparison result of comparing the respective first and second error rates, updating three values out of the upper limit, the lower limit, the first value point and the second value point, resulting in decreasing the first parameter value interval and a distance between the first value point and the second value point, wherein a relative order of the lower limit, the first value point, the second value point and the upper limit remains unchanged by the updating;

(5) Repeating steps (3) and (4) above, until the precision requirement is met by the respective first and second value points; and (6) When the precision requirement is met by the respective first and second error rates, obtaining the optimal value of the training parameter from between the first value point and the second value point in accordance with a second predetermined formula.

In some embodiments, the precision requirement specifies that the respective distance between the respective first value point and the respective second value point is smaller than a predetermined precision value.

In some embodiments, the first predetermined formula specifies that the first value point is higher than the lower limit by a predetermined fraction of the first parameter value interval and the second value point is lower than the upper limit by the predetermined fraction of the first parameter value interval.

In some embodiments, in accordance with the respective comparison result of comparing the respective first and second error rates, updating three values out of the upper limit, the lower limit, the first value point and the second value point, resulting in decreasing the first parameter value interval and a distance between the first value point and the second value point, further includes: if the respective first error rate is higher than the respective second error rate, increasing the lower limit, the first value point and the second value point, while keeping the upper limit unchanged; and if the first error rate is lower than the second error rate, decreasing the upper limit, the first value point and the second value point, while keeping the lower limit unchanged.

In some embodiments, increasing the lower limit, the first value point and the second value point includes: updating the lower limit by replacing a respective value of the lower limit with a respective value of the first value point; obtaining respective updated values of the first value point and the second value point in accordance with the first predetermined formula, the updated lower limit and the upper limit; and updating the first and second value points with the respective updated values.

In some embodiments, decreasing the upper limit, the first value point and the second value point includes: updating the lower limit by replacing a respective value of the lower limit with a respective value of the first value point; obtaining respective updated values of the first value point and the second value point in accordance with the first predetermined formula, the lower limit and the updated upper limit; and updating the first and second value points with the respective updated values.

In some embodiments, obtaining and comparing respective first and second error rates of a model by respectively setting the training parameter at the first and second value points for the model further includes:

(a) Dividing a labeled corpus into multiple equal portions;

(b) Setting a first portion of the multiple portions as respective testing samples, wherein the first portion has not been used as testing samples to generate an error rate for the model before, and wherein a remainder of the multiple portions are used as respective training samples for the model;

(c) Obtaining a respective error rate of the model corresponding to the respective testing samples and the first value point, further including: setting the training parameter of the model at the first value point; training the model with the respective training samples to obtain respective first values of a predetermined set of model parameters; and obtaining the respective error rate for the respective testing samples by testing the model against the testing samples using the obtained respective first values of the predetermined set of model parameters;

(d) Obtaining the respective error rate of the model corresponding to the respective testing samples and the second value point, further including: setting the training parameter of the model at the second value point; training the model with the respective training samples to obtain respective second values of the predetermined set of model parameters; and obtaining the respective error rate for the respective testing samples by testing the model against the testing samples using the obtained respective second values of the predetermined set of model parameters;

(e) Repeating steps (b)-(d) above until each of the multiple portions has been used as testing samples once;

(f) Obtaining the first error rate by averaging the error rates corresponding to each of the multiple portions as testing samples and the first value point as a respective value for the training parameter;

(g) Obtaining the second error rate by averaging the error rates corresponding to each of the multiple portions as testing samples and the second value point as the respective value for the training parameter; and (h) Determining which of the respective first error rate or the respective second error rate is higher.

Other functions of the training module 320 and the computer 300 are described with respect to FIGS. 1 and 2 above, and are not repeated herein.

Figure 4:
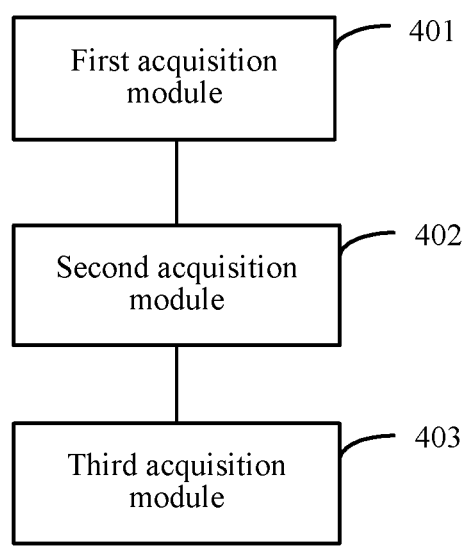
FIG. 4 is a schematic structural diagram of a training parameter acquisition apparatus in accordance with some embodiments.

FIG. 4 is a schematic structural diagram of a training parameter acquisition apparatus in accordance with some embodiments. The apparatus comprises a first acquisition module 401, a second acquisition module 402, and a third acquisition module 403. In accordance with some embodiments, the first acquisition module 401 used for acquiring a first parameter value interval and a precision value. The second acquisition module 402 is used for acquiring a training parameter value interval from the first parameter value interval according to the precision value. The third acquisition module 403 is used for acquiring a training parameter from the training parameter value interval.

In accordance with some embodiments, the second acquisition module 402 includes: a first determination unit, used for determining an interval in the first parameter value interval and a second determination unit, used for, if the second parameter value interval meets the precision requirement, determining the second parameter value interval as the training parameter value interval.

Further, the second acquisition module 402 further includes: a first setting unit, used for, setting a first value point, and a first update unit used for updating the second parameter value interval.

In accordance with some embodiments, the first update unit includes: a first acquisition subunit, used for acquiring the second value point; a first calculation subunit, used for calculating a first value point and the lower limit value and the upper limit value, and a first update subunit, used for updating the second parameter value interval.

Further, the second acquisition module 402 further includes: a second setting unit, used for: setting the upper limit value of the first parameter value interval as the second value point; and a second update unit, used for updating the second parameter value interval.

The second update unit includes: a second acquisition subunit, used for acquiring the first value point; a second calculation subunit, used for calculating a second value point, the lower limit and the upper limit; and a second update subunit, used for updating the second parameter value interval.

The third acquisition module 403 is used for acquiring an optimal value of the training parameter in accordance with the second predetermined formula.

While particular embodiments are described above, it will be understood it is not intended to limit the technology to these particular embodiments. On the contrary, the technology includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific embodiments.

However, the illustrative discussions above are not intended to be exhaustive or to limit the technology to the precise forms disclosed. Many modifications and variations are possible in view of the above teachings. The embodiments were chosen and described in order to best explain the principles of the technology and its practical applications, to thereby enable others skilled in the art to best utilize the technology and various embodiments with various modifications as are suited to the particular use contemplated.

What is claimed is:

1. A method of computationally selecting respective optimal values for one or more training parameters for training a model that performs prediction and analysis on information elements arranged in a sequence, comprising:
    at a device of having one or more processors and memory for storing one or more programs to be executed by the one or more processors:
        (1) setting a precision requirement for the model, and a first parameter value interval defined by an upper limit and a lower limit, the first parameter value interval being set wide enough to include an optimal value of a training parameter of the model;
        (2) obtaining a first value point and a second value point within the first parameter value interval in accordance with a first predetermined formula, wherein the first value point is smaller than the second value point;
        (3) obtaining and comparing respective first and second error rates of the model by respectively setting the training parameter at the first and second value points for the model;
        (4) in accordance with a respective comparison result of comparing the respective first and second error rates, updating three values out of the upper limit, the lower limit, the first value point and the second value point, resulting in decreasing the first parameter value interval and a distance between the first value point and the second value point, wherein a relative order of the lower limit, the first value point, the second value point and the upper limit remains unchanged by the updating;
        (5) repeating steps (3) and (4), until the precision requirement is met by the respective first and second value points; and
        (6) when the precision requirement is met by the respective first and second error rates, obtaining the optimal value of the training parameter from between the first value point and the second value point in accordance with a second predetermined formula, wherein the obtained optimal value of the training parameter is provided to a user to calibrate the model through subsequent training.

2. The method of claim 1, wherein the precision requirement specifies that the respective distance between the respective first value point and the respective second value point is smaller than a predetermined precision value.

3. The method of claim 1, wherein the first predetermined formula specifies that the first value point is higher than the lower limit by a predetermined fraction of the first parameter value interval and the second value point is lower than the upper limit by the predetermined fraction of the first parameter value interval.

4. The method of claim 1, wherein in accordance with the respective comparison result of comparing the respective first and second error rates, updating three values out of the upper limit, the lower limit, the first value point and the second value point, resulting in decreasing the first parameter value interval and a distance between the first value point and the second value point, further comprises:
    if the respective first error rate is higher than the respective second error rate, increasing the lower limit, the first value point and the second value point, while keeping the upper limit unchanged; and
    if the first error rate is lower than the second error rate, decreasing the upper limit, the first value point and the second value point, while keeping the lower limit unchanged.

5. The method of claim 4, wherein increasing the lower limit, the first value point and the second value point comprises:
    updating the lower limit by replacing a respective value of the lower limit with a respective value of the first value point;
    obtaining respective updated values of the first value point and the second value point in accordance with the first predetermined formula, the updated lower limit and the upper limit; and
    updating the first and second value points with the respective updated values.

6. The method of claim 4, wherein decreasing the upper limit, the first value point and the second value point comprises:
    updating the lower limit by replacing a respective value of the lower limit with a respective value of the first value point;
    obtaining respective updated values of the first value point and the second value point in accordance with the first predetermined formula, the lower limit and the updated upper limit; and
    updating the first and second value points with the respective updated values.

7. The method of claim 1, wherein obtaining and comparing respective first and second error rates of a model by respectively setting the training parameter at the first and second value points for the model further comprises:
    (a) dividing a labeled corpus into multiple equal portions;
    (b) setting a first portion of the multiple portions as respective testing samples, wherein the first portion has not been used as testing samples to generate an error rate for the model before, and wherein a remainder of the multiple portions are used as respective training samples for the model;
    (c) obtaining a respective error rate of the model corresponding to the respective testing samples and the first value point, further comprising:
        setting the training parameter of the model at the first value point;
        training the model with the respective training samples to obtain respective first values of a predetermined set of model parameters; and
        obtaining the respective error rate for the respective testing samples by testing the model against the testing samples using the obtained respective first values of the predetermined set of model parameters;
    (d) obtaining the respective error rate of the model corresponding to the respective testing samples and the second value point, further comprising:
        setting the training parameter of the model at the second value point;
        training the model with the respective training samples to obtain respective second values of the predetermined set of model parameters; and
        obtaining the respective error rate for the respective testing samples by testing the model against the testing samples using the obtained respective second values of the predetermined set of model parameters;
(e) repeating steps (b)-(d) until each of the multiple portions has been used as testing samples once;
(f) obtaining the first error rate by averaging the error rates corresponding to each of the multiple portions as testing samples and the first value point as a respective value for the training parameter;
(g) obtaining the second error rate by averaging the error rates corresponding to each of the multiple portions as testing samples and the second value point as the respective value for the training parameter; and
(h) determining which of the respective first error rate or the respective second error rate is higher.

8. A device of computationally selecting respective optimal values for one or more training parameters for training a model that performs prediction and analysis on information elements arranged in a sequence, comprising:
one or more processors; and
memory storing one or more programs for execution by the one or more processors, the one or more programs including instructions for:
(1) setting a precision requirement for the model, and a first parameter value interval defined by an upper limit and a lower limit, the first parameter value interval being set wide enough to include an optimal value of a training parameter;
(2) obtaining a first value point and a second value point within the first parameter value interval in accordance with a first predetermined formula, wherein the first value point is smaller than the second value point;
(3) obtaining and comparing respective first and second error rates of the model by respectively setting the training parameter at the first and second value points for the model;
(4) in accordance with a respective comparison result of comparing the respective first and second error rates, updating three values out of the upper limit, the lower limit, the first value point and the second value point, resulting in decreasing the first parameter value interval and a distance between the first value point and the second value point, wherein a relative order of the lower limit, the first value point, the second value point and the upper limit remains unchanged by the updating;
(5) repeating steps (3) and (4), until the precision requirement is met by the respective first and second value points; and
(6) when the precision requirement is met by the respective first and second error rates, obtaining the optimal value of the training parameter from between the first value point and the second value point in accordance with a second predetermined formula, wherein the obtained optimal value of the training parameter is provided to a user to calibrate the model through subsequent training.

9. The device of claim 8, wherein the precision requirement specifies that the respective distance between the respective first value point and the respective second value point is smaller than a predetermined precision value.

10. The device of claim 8, wherein the first predetermined formula specifies that the first value point is higher than the lower limit by a predetermined fraction of the first parameter value interval and the second value point is lower than the upper limit by the predetermined fraction of the first parameter value interval.

11. The device of claim 8, wherein in accordance with the respective comparison result of comparing the respective first and second error rates, updating three values out of the upper limit, the lower limit, the first value point and the second value point, resulting in decreasing the first parameter value interval and a distance between the first value point and the second value point, further comprises:
if the respective first error rate is higher than the respective second error rate, increasing the lower limit, the first value point and the second value point, while keeping the upper limit unchanged; and
if the first error rate is lower than the second error rate, decreasing the upper limit, the first value point and the second value point, while keeping the lower limit unchanged.

12. The device of claim 11, wherein increasing the lower limit, the first value point and the second value point comprises:
updating the lower limit by replacing a respective value of the lower limit with a respective value of the first value point;
obtaining respective updated values of the first value point and the second value point in accordance with the first predetermined formula, the updated lower limit and the upper limit; and
updating the first and second value points with the respective updated values.

13. The device of claim 11, wherein decreasing the upper limit, the first value point and the second value point comprises:
updating the lower limit by replacing a respective value of the lower limit with a respective value of the first value point;
obtaining respective updated values of the first value point and the second value point in accordance with the first predetermined formula, the lower limit and the updated upper limit; and
updating the first and second value points with the respective updated values.

14. The device of claim 8, wherein obtaining and comparing respective first and second error rates of a model by respectively setting the training parameter at the first and second value points for the model further comprises:
(a) dividing a labeled corpus into multiple equal portions;
(b) setting a first portion of the multiple portions as respective testing samples, wherein the first portion has not been used as testing samples to generate an error rate for the model before, and wherein a remainder of the multiple portions are used as respective training samples for the model;
(c) obtaining a respective error rate of the model corresponding to the respective testing samples and the first value point, further comprising:
setting the training parameter of the model at the first value point;
training the model with the respective training samples to obtain respective first values of a predetermined set of model parameters; and
obtaining the respective error rate for the respective testing samples by testing the model against the testing samples using the obtained respective first values of the predetermined set of model parameters;
(d) obtaining the respective error rate of the model corresponding to the respective testing samples and the second value point, further comprising:
setting the training parameter of the model at the second value point;

training the model with the respective training samples to obtain respective second values of the predetermined set of model parameters; and obtaining the respective error rate for the respective testing samples by testing the model against the testing samples using the obtained respective second values of the predetermined set of model parameters;

(e) repeating steps (b)-(d) until each of the multiple portions has been used as testing samples once;

(f) obtaining the first error rate by averaging the error rates corresponding to each of the multiple portions as testing samples and the first value point as a respective value for the training parameter;

(g) obtaining the second error rate by averaging the error rates corresponding to each of the multiple portions as testing samples and the second value point as the respective value for the training parameter; and (h) determining which of the respective first error rate or the respective second error rate is higher.

15. A non-transitory computer readable storage medium for computationally selecting respective optimal values for one or more training parameters for training a model that performs prediction and analysis on information elements arranged in a sequence, the computer readable storage medium having instructions stored thereon, the instructions, when executed by one or more processors, cause the processors to perform operations comprising:

(1) setting a precision requirement for the model, and a first parameter value interval defined by an upper limit and a lower limit, the first parameter value interval being set wide enough to include an optimal value of a training parameter;

(2) obtaining a first value point and a second value point within the first parameter value interval in accordance with a first predetermined formula, wherein the first value point is smaller than the second value point;

(3) obtaining and comparing respective first and second error rates of the model by respectively setting the training parameter at the first and second value points for the model;

(4) in accordance with a respective comparison result of comparing the respective first and second error rates, updating three values out of the upper limit, the lower limit, the first value point and the second value point, resulting in decreasing the first parameter value interval and a distance between the first value point and the second value point, wherein a relative order of the lower limit, the first value point, the second value point and the upper limit remains unchanged by the updating;

(5) repeating steps (3) and (4), until the precision requirement is met by the respective first and second value points; and (6) when the precision requirement is met by the respective first and second error rates, obtaining the optimal value of the training parameter from between the first value point and the second value point in accordance with a second predetermined formula, wherein the obtained optimal value of the training parameter is provided to a user to calibrate the model through subsequent training.

16. The non-transitory computer readable storage medium of claim 15, wherein the precision requirement specifies that the respective distance between the respective first value point and the respective second value point is smaller than a predetermined precision value.

17. The non-transitory computer readable storage medium of claim 15, wherein the first predetermined formula specifies that the first value point is higher than the lower limit by a predetermined fraction of the first parameter value interval and the second value point is lower than the upper limit by the predetermined fraction of the first parameter value interval.

18. The non-transitory computer readable storage medium of claim 15, wherein in accordance with the respective comparison result of comparing the respective first and second error rates, updating three values out of the upper limit, the lower limit, the first value point and the second value point, resulting in decreasing the first parameter value interval and a distance between the first value point and the second value point, further comprises:

if the respective first error rate is higher than the respective second error rate, increasing the lower limit, the first value point and the second value point, while keeping the upper limit unchanged; and if the first error rate is lower than the second error rate, decreasing the upper limit, the first value point and the second value point, while keeping the lower limit unchanged.

19. The non-transitory computer readable storage medium of claim 18, wherein increasing the lower limit, the first value point and the second value point comprises:

updating the lower limit by replacing a respective value of the lower limit with a respective value of the first value point;

obtaining respective updated values of the first value point and the second value point in accordance with the first predetermined formula, the updated lower limit and the upper limit; and updating the first and second value points with the respective updated values.

20. The non-transitory computer readable storage medium of claim 18, wherein decreasing the upper limit, the first value point and the second value point comprises:

updating the lower limit by replacing a respective value of the lower limit with a respective value of the first value point;

obtaining respective updated values of the first value point and the second value point in accordance with the first predetermined formula, the lower limit and the updated upper limit; and updating the first and second value points with the respective updated values.

* * * * *